(12) United States Patent
Siemens et al.

(10) Patent No.: US 12,398,680 B2
(45) Date of Patent: Aug. 26, 2025

(54) SYSTEM AND METHOD TO PREVENT BLEED AIR OVER-EXTRACTION IN AIRCRAFT

(71) Applicant: Textron Aviation Inc., Wichita, KS (US)

(72) Inventors: Trey Marcus Siemens, Wichita, KS (US); Burl Justin Fletcher, Wichita, KS (US)

(73) Assignee: Textron Innovations Inc., Providence, RI (US)

( * ) Notice: Subject to any disclaimer, the term of this patent is extended or adjusted under 35 U.S.C. 154(b) by 0 days.

(21) Appl. No.: 18/581,952

(22) Filed: Feb. 20, 2024

(65) Prior Publication Data

US 2024/0280059 A1   Aug. 22, 2024

Related U.S. Application Data

(60) Provisional application No. 63/486,416, filed on Feb. 22, 2023.

(51) Int. Cl.
*F02C 9/18* (2006.01)
*B64D 13/06* (2006.01)

(52) U.S. Cl.
CPC ............... *F02C 9/18* (2013.01); *B64D 13/06* (2013.01); *B64D 2013/0618* (2013.01); *F05D 2220/323* (2013.01); *F05D 2260/606* (2013.01); *F05D 2270/306* (2013.01); *F05D 2270/335* (2013.01)

(58) Field of Classification Search
CPC ... F02C 6/08; F02C 9/18; B64D 13/06; B64D 2013/0618; B64D 2013/0603; F05D 2260/606; F05D 2270/306; F05D 2270/335

See application file for complete search history.

(56) References Cited

U.S. PATENT DOCUMENTS

| | | | | |
|---|---|---|---|---|
| 4,991,389 | A * | 2/1991 | Schafer | F04D 27/023 60/39.24 |
| 11,161,616 | B2 * | 11/2021 | Wiegers | F04F 5/48 |
| 2007/0240426 | A1 * | 10/2007 | Wiegman | F02C 9/00 60/793 |
| 2013/0327014 | A1 * | 12/2013 | Moulebhar | F02K 3/065 60/226.2 |

(Continued)

*Primary Examiner* — Jason H Duger
(74) *Attorney, Agent, or Firm* — Avek IP, LLC

(57) ABSTRACT

A pneumatic flow control system for an aircraft includes a control system operating and implementing a software program through a digital environment, the software program having one or more rules; a sensor in digital communication with the control system, the sensor to relay engine power data to the control system; an electronically controlled valve in digital communication with the control system, the electronically controlled valve to control an amount of bleed air flowing therethrough; a first rule defining an engine power parameter and a valve position for the electronically controlled valve and using the engine power data relayed from the sensor, receiving data equating to the engine power parameter activates transmitting a command to the electronically controlled valve to adjust to the valve position; and the valve position is set to restrict flow through the valve to below a threshold limit.

20 Claims, 3 Drawing Sheets

(56) References Cited

U.S. PATENT DOCUMENTS

| | | |
|---|---|---|
| 2015/0107261 A1* | 4/2015 | Moes .................. B64D 41/00 |
| | | 60/785 |
| 2015/0252731 A1 | 9/2015 | Riordan |
| 2020/0346762 A1 | 11/2020 | Pachidis et al. |
| 2022/0097864 A1* | 3/2022 | Baladi ..................... F02C 9/18 |
| 2022/0220902 A1 | 7/2022 | Manoukian et al. |
| 2023/0383673 A1* | 11/2023 | Duranleau-Hendrickx ................ |
| | | F02C 9/18 |

\* cited by examiner

SYSTEM AND METHOD TO PREVENT BLEED AIR OVER-EXTRACTION IN AIRCRAFT

CROSS-REFERENCE TO RELATED APPLICATIONS

This application claims the benefit of priority of U.S. Provisional Patent Application No. 63/486,416, filed on Feb. 22, 2023, the disclosure of which is herein incorporated by reference in its entirety.

BACKGROUND

1. Field

Embodiments of the disclosure relate to pneumatic control systems for aircrafts, and in particular to a system and method to prevent bleed air over-extraction in aircrafts through monitoring engine power.

2. Related Art

Aircraft require environmental control of the cockpit and cabin to provide habitable pressure, temperature and ventilation. As part of reaching these objectives, bleed air is typically extracted from the aircraft engine and provided to an Environmental Control System (ECS), which in turn regulates pressure and temperature for providing to the aircraft environment. Pneumatic control systems are known in the art for aiding in the process of using bleed air in an aircraft environment. For example, U.S. Pat. No. 11,161,616 to Wiegers et al. describes a pneumatic system for aircraft that provides for selecting and mixing air from a high pressure source, a low pressure source, and ambient air to an Environmental Control System (ECS) for use within the aircraft. U.S. Patent Publication No. 2015/0107261 to Moes et al. describes an aircraft bleed air system that utilizes sensors to sense bleed air system conditions, and the ECS enters into an appropriate mode based on the conditions, wherein the mode is selected to provide required cabin air flow and temperature at an optimal specific fuel consumption of a gas turbine engine at the sensed system conditions. U.S. Patent Publication No. 2015/0252731 to Riordan describes an aircraft bleed air system that uses flow-control valves to selectively open and close flow from a compressor of a gas turbine engine to direct airflow through various paths of the system. U.S. Patent Publication No. 2020/0346762 to Pachidis et al. discloses a flow control system wherein compressor flow rate is controlled independently from engine power, to allow the system to deliver a desired flow at a predetermined pressure. U.S. Patent Publication No. 2022/0220902 to Manoukian et al. describes an aircraft bleed air system that uses a solenoid valve in electrical communication with an engine control system for controlling bleed air flow.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

In embodiments, the present disclosure includes a pneumatic flow control system for an aircraft, including a control system operating a software program, the control system and software program being implemented through a digital environment, the software having one or more rules. At least one sensor is in digital communication with the control system, the at least one sensor determines and relays engine power data. At least one electronically controlled valve is in digital communication with the control system, the at least one electronically controlled valve controls an amount of bleed air flowing therethrough. The one or more rules include a first rule defining an engine power parameter and a valve position for the at least one electronically controlled valve, wherein receiving data matching the engine power parameter activates transmitting a command for the valve position to the at least one electronically controlled valve, and wherein the valve position is set to restrict flow through the at least one valve to below a threshold limit.

In other embodiments, the present disclosure includes a pneumatic flow control method, including: providing a control system with a software program thereon; installing at least one electronically controlled valve to control an amount of bleed air flowing from an engine to an aircraft environment, the at least one electronically controlled valve in digital communication with the control system; setting a valve position for the at least one electronically controlled valve, the valve position to restrict flow through the at least one valve to below a threshold limit; monitoring power of an engine via at least one sensor in digital communication with the control system; setting an engine power parameter; determining, via the control system, when the engine power parameter is met based on the monitoring of power by the at least one sensor; and sending a command to the at least one valve to adjust the at least one valve to the valve position when the engine power parameter is met.

BRIEF DESCRIPTION OF THE DRAWING FIGURES

Embodiments of the invention are described in detail below with reference to the attached drawing figures, wherein.

Figure 1:
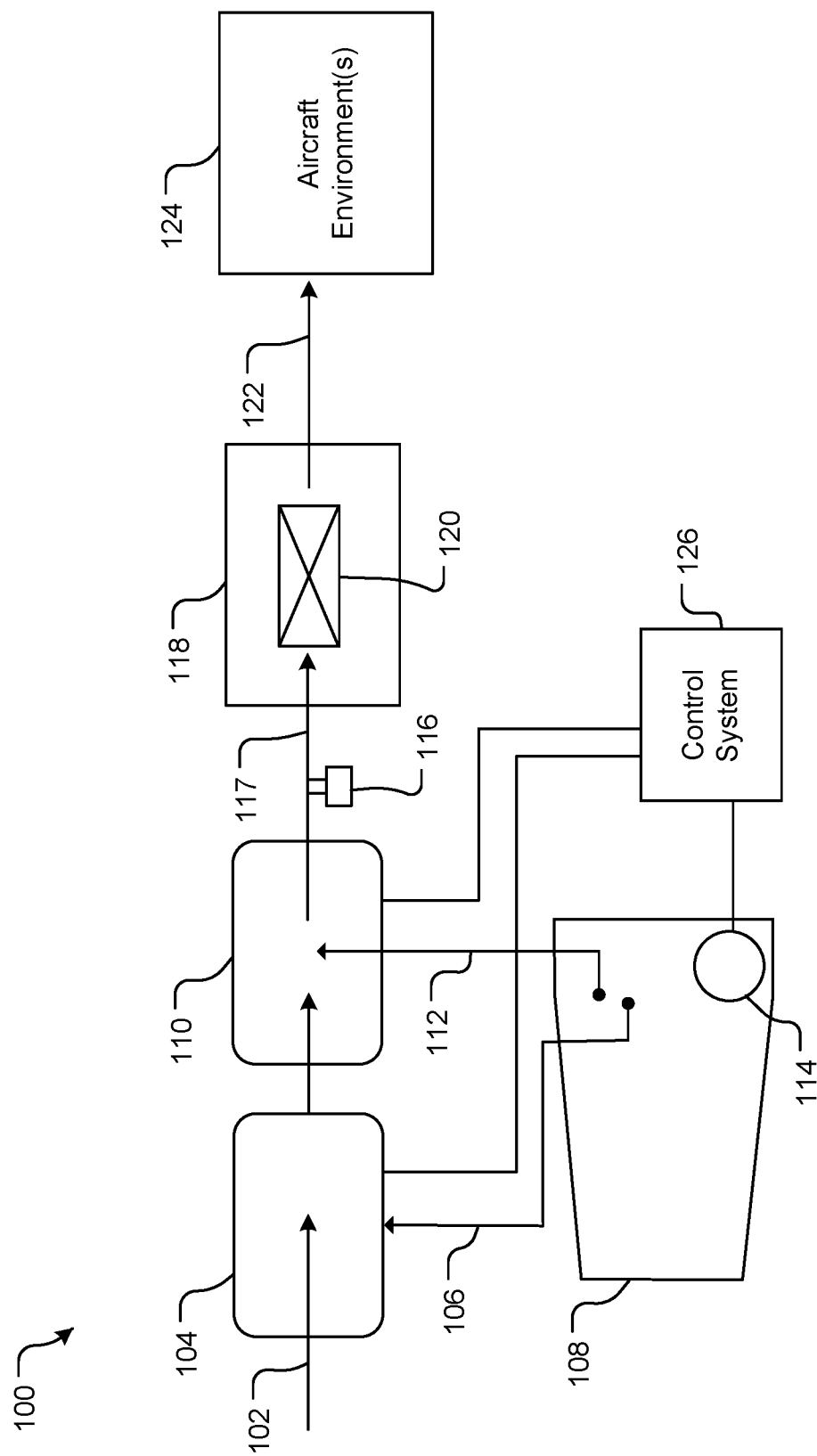
FIG. 1 depicts a simplified diagram of a pneumatic flow control system in accordance with the present invention.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of the equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

Aircraft require that the cabin be ventilated, temperature controlled, and pressurized to maintain a habitable environment for the passengers and crew. Conventionally, bleed air may be extracted from one or more of the engine's compressor stages to provide a source of elevated temperature and elevated pressure air which may be utilized for temperature and pressure regulation of the aircraft environment. Based on the compressor stages used, a range of available bleed air pressures and temperatures may be provided depending on engine power and ambient air conditions. However, some aircraft engines are configured to increase rapidly in power and pressure, and therefore without any control, bleed air extraction would also increase rapidly and may exceed a threshold limit of bleed air extraction for a period of time.

Some conventional methods to combat rapid engine power increases include permanently limiting a bleed air valve in a safe position that ensures the bleed air extraction remains below a desired threshold. Another conventional method of flow control utilizes regulation of the air pressure from the engine bleed air port. Using a permanent limiting method would hinder efficiency, as at times, it would be desirable to have the valve in a more open position and/or provide a higher pressure than conventional methods in which pressure is regulated.

Embodiments of the present disclosure overcome these drawbacks by providing a system and method for preventing bleed air over-extraction by monitoring engine power and upon detecting an increase in rate of engine power, predicting an approaching engine power and corresponding pressure rise, and using this information to activate adjustment of one or more electronic valves to a pre-set position. The pre-set position is determined ahead of time and is calculated to be a safe position that will prevent bleed air over-extraction during high pressure times. These embodiments allow for a rapid change in the valve position to prevent over-extraction before it occurs.

FIG. 1 depicts a pneumatic flow control system 100 in accordance with embodiments of the present disclosure. System 100 may include any conventional devices as would be known in the art and associated with bleed-air extraction for aircraft. Air 117 from system 100 is directed to an Environmental Control System (ECS) 118, which regulates pressure, flow rate and temperature of an air supply 122 provided to an aircraft environment 124, such as the aircraft cabin or cockpit, for heating, cooling, ventilation and pressurization. The ECS 118 may utilize various devices as known in the art, including a heat exchanger 120 for temperature control.

Air provided to the ECS 118 may originate from one or more sources, including high pressure (HP) bleed air 112 and low-pressure (LP) bleed air 106 from an engine 108, as well as ambient air 102. LP bleed air typically has a gauge pressure between about 10-psig to about 100-psig, and HP bleed air typically has as a gauge pressure between about 30-psig to about 300-psig. However, these pressure ranges are exemplary only since engine bleed air pressures may vary considerably based on engine design, ambient conditions, and power settings. The present invention is not limited in applicability to one source of bleed air, and instead may be applicable to any bleed air port, including low pressure, intermediate pressure, or high pressure. The ambient air 102 is supplied from the ambient environment (e.g., via an aerodynamic inlet). Embodiments of the present disclosure are particularly adapted for use with HP bleed air 112, which depends on engine power and pressure.

System 100 includes one or more valves 104, 110 to control air flow from the sources 102, 106, 112 to the ECS 118. At least one valve, valve 110, in exemplary embodiments discussed herein, is an electronically controlled flow control valve, which is in digital communication with a control system 126. Control system 126 is to send one or more commands to the valve 110 to adjust a position of the valve and therefore control the flowrate of air 117 to the ECS 118. Valve 110, with communication from the control system 126, operates to ensure the flowrate remains below a predetermined threshold.

System 100 includes one or more engine sensors 114 in digital communication with the control system 126, the sensor(s) 114 configured to monitor engine power parameters and provide data to the control system 126. In embodiments, the engine power parameter is a percent shaft horsepower parameter, however those skilled in the art will understand that other sensors and/or parameters may be used. The control system 126 will analyze the data received from the sensor(s) 114 to determine when engine power is increasing at or above a preset rate. When the rate of increase reaches the preset rate, as determined appropriate based on one or more factors, such as the type of engine, the control system 126 will send a command to the valve 110 to adjust to a pre-set position. The pre-set position is selected based on one or more factors as determined to keep the flowrate below a threshold limit. Specifically, the system 100 is configured to keep the flowrate below an engine core flow extraction certification limit.

In some embodiments, the flowrate of air 117 may further be monitored by a flowrate sensor 116, which may further provide feedback to the control system 126. Those skilled in the art will appreciate that monitoring the engine power via the sensor(s) 114 provides for a proactive approach to control the flowrate from the valve 110, as opposed to waiting on other conventional feedback, such as from flowrate sensor 116, to make adjustments to the valve 110. This is particularly beneficial in high power engines, where the engine 108 increases rapidly in power and pressure, such that any delay in valve adjustment could allow the flowrate to increase above the threshold limit.

In some embodiments, only one or more valves 110 receiving high pressure bleed air 112 are adjusted, however, it is contemplated that the system 100 can be adapted for also controlling additional electronic valves 104.

Figure 2:
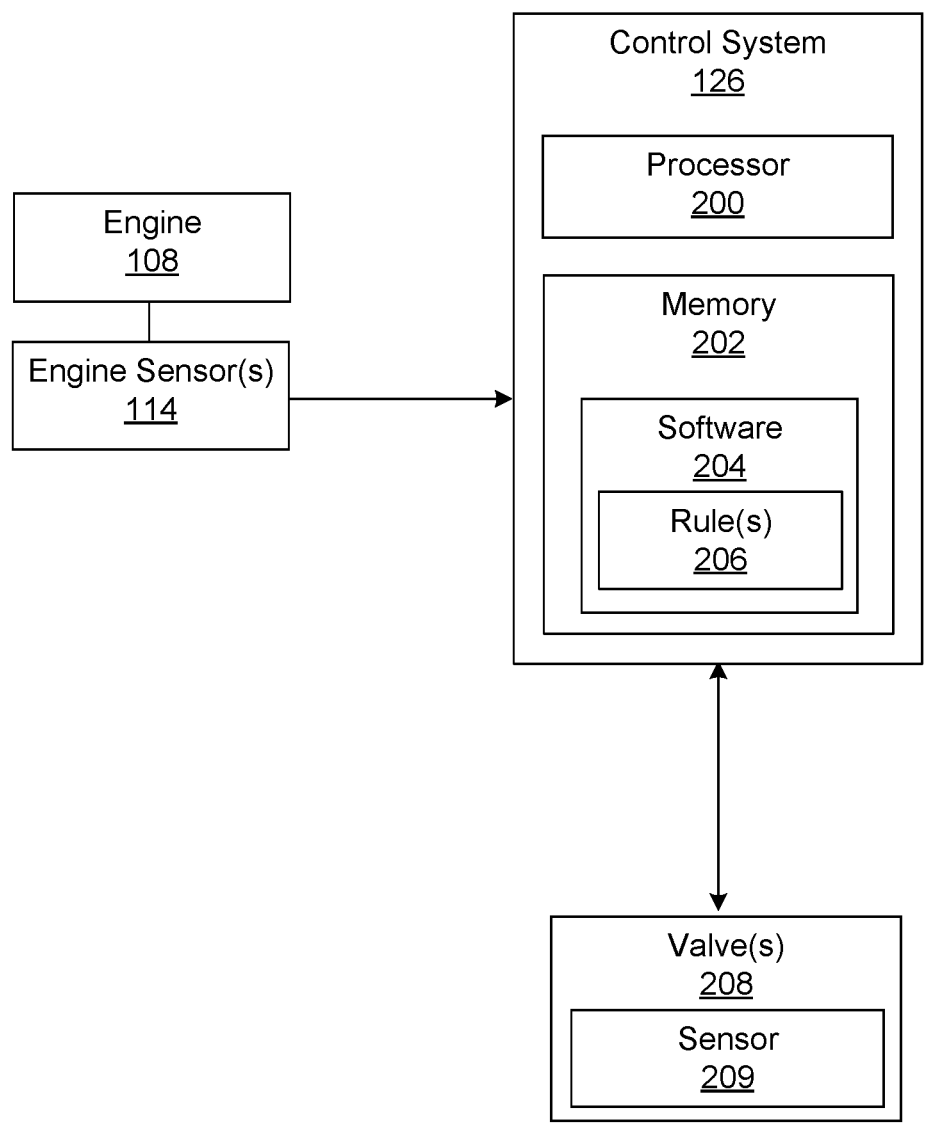
FIG. 2 depicts a block diagram illustrating a control architecture for controlling components of the system of FIG. 1.

FIG. 2 is a block diagram illustrating a digital environment for adjusting one or more valves 208 through the control system 126. The one or more valves 208 may be valves 104, 110 as operated via the control system. Control system 126 includes a processor 200, which may be a computer or other processing device, either operational within an aircraft or separate from the aircraft. A memory 202 may be used to store software 204 thereon, wherein the software 204 holds one or more rules 206 for implementing through the processor 200. As would be understood by those skilled in the art, the processor 200, memory 202, and software 204 may be incorporated into a single machine or multiple machines, and may include a plurality of additional structural, hardware, or software components necessary to implement the methods discussed herein. The control system 126 will be in digital communication with the sensor(s) 114 and the one or more valves 208, the digital communication may be achieved via wired or wireless communication methods. In embodiments, each of the valves 208 may include a valve position sensor 209 which provides valve position information to the control system 126 such that the control system 126 can determine when the valves 208 are set to a defined position. Accordingly, the control system 126 can determine if valve adjustment is needed.

The one or more rules 206 include at least a first rule which defines an engine power parameter for triggering adjustment of the valve(s) 208 to pre-set valve position(s), wherein receiving data equating to the engine power parameter from the engine sensor(s) 114 activates a command to send to the valve(s) 208 for adjusting to the valve(s) position to restrict airflow. In other words, when the control system 126 determines there is a rapid rise in engine power, the valve(s) 208 will be proactively adjusted to the pre-set valve position. In embodiments, the engine power parameter is a percent shaft horsepower parameter from the sensor(s) 114, which provides a rate of power increase. A user will define the parameter for the software 204, such as a threshold rate of power increase. The pre-set position for the valve(s) 208 will also be set by a user and determined based on user calculations taking into account any number of factors, such as engine model, the pre-set position ensuring the flowrate will remain below a desired limit.

Figure 3:
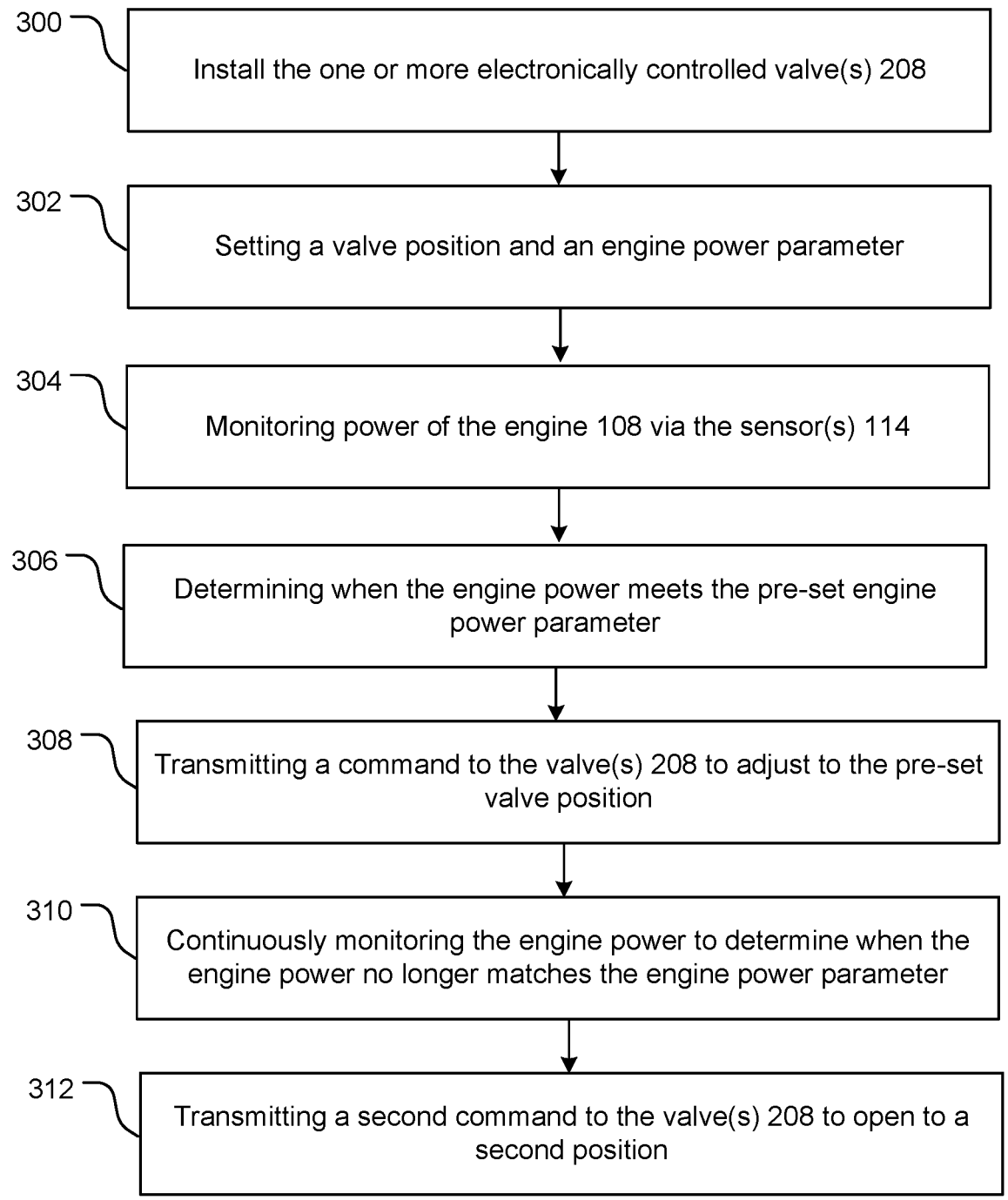
FIG. 3 depicts a flowchart of a method to prevent bleed air overextraction using the system of FIG. 1 and the control architecture of FIG. 2.

FIG. 3 is a flowchart of a method to prevent bleed air over extraction using the system of FIG. 1 and the digital environment of FIG. 2. At step 300, the one or more electronically controlled valve(s) 208 are installed along airflow lines, including at least one bleed air line from the engine 108. At step 302, the user will set the engine parameter and the valve position, such that the engine power parameter triggers valve adjustment to the pre-set valve position. The valve position and engine power parameter may vary depending on factors such as the type of valve, flowrate limits, engine models, altitude, aircraft environment, or any other factor as determined appropriate by those skilled in the art. At steps 304, 306, and 308, the control system 126 will monitor data from the engine sensor(s) 114 and if the engine power parameter is indicated by the data, a command will be generated and transmitted to the valve(s) 208 for adjustment to the pre-set valve position. At steps 310 and 312, the control system 126 will continue to monitor the engine power via the sensor(s) 114 and if/when the data indicates that the engine power parameter is no longer met, such as when engine power and pressure decrease, the control system 126 will transmit a second command to the valve(s) 208 to readjust out of the pre-set position, such as to a fully open or second pre-set position. In some embodiments, the user may define a second position, or alternatively, the valve(s) 208 will merely revert back to a starting or fully open position.

The systems and methods discussed herein overcome the shortcomings of conventional methods of preventing bleed air over-extraction by predicting when engine power and pressure are likely to rise rapidly, and reacting quickly by adjusting the flow-control valve(s) to pre-set positions which are known to keep the flowrate below a threshold limit, such as a maximum engine core flow extraction limit as specified by the engine manufacturer.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A pneumatic flow control system for an aircraft, comprising:
   a control system operating a software program, the control system and software program being implemented through a digital environment, the software program having one or more rules associated with preventing an amount of bleed air from over-extraction into an aircraft environment of the aircraft;
   at least one sensor in digital communication with the control system, the at least one sensor configured to relay engine power data to the control system;
   at least one electronically controlled valve in digital communication with the control system, the at least one electronically controlled valve configured to control the amount of the bleed air flowing therethrough;
   the one or more rules include a first rule defining an engine power parameter and a corresponding pre-set valve position, each being user-defined, for triggering a valve adjustment of the at least one electronically controlled valve;
   wherein upon detecting a rapid increase in engine power that meets or exceeds the engine power parameter, the control system transmits a command to the at least one electronically controlled valve based on the first rule triggering the valve adjustment, such that the at least one electronically controlled valve dynamically adjusts to the pre-set valve position to restrict flow to within a predetermined range.

2. The system of claim 1, wherein the control system further comprises a non-transitory memory for storing the software program thereon and a processor for executing the software program.

3. The system of claim 2, wherein the control system performs the steps of:
   receiving the engine power data from the at least one sensor;
   monitoring the engine power data to determine when engine power equates to the engine power parameter; and
   sending the command to implement the valve position when the engine power data equates to the engine power parameter.

4. The system of claim 3, wherein the control system performs the steps of:
   monitoring the engine power data to determine when the engine power no longer equates to the engine power parameter; and
   sending a second command to adjust the at least one electronically controlled valve to a second position.

5. The system of claim 4, wherein the second position is a fully open position.

6. The system of claim 1, wherein the engine power parameter is a measured rate of increase in engine power.

7. The system of claim 1, wherein the engine power parameter is a percent shaft horsepower parameter.

8. The system of claim 1, wherein the predetermined range includes a limit based on an engine core flow extraction certification limit.

9. The system of claim 1, wherein the bleed air is high pressure bleed air generated from an aircraft engine.

10. The system of claim 1, further comprising a flowrate sensor configured to monitor an amount of bleed air flowing through at least one electronically controlled valve.

11. The system of claim 1, further comprising an Environmental Control System (ECS) configured to receive the amount of bleed air flowing through the at least one electronically controlled valve, the ECS regulating an air supply provided to an aircraft environment.

12. A pneumatic flow control method for an aircraft, comprising:
providing a control system with a software program thereon;
installing at least one electronically controlled valve to control an amount of bleed air flowing from an engine to an aircraft environment, the at least one electronically controlled valve in digital communication with the control system;
receiving user input to define a valve position for the at least one electronically controlled valve and an engine power parameter, the valve position being configured to restrict flow through the at least one valve to within a predetermined range that prevents the amount of the bleed air from over-extraction into the aircraft environment;
monitoring power of an engine via at least one engine sensor in digital communication with the control system;
detecting, based on a rate of change of the monitored engine power, whether the engine power is predicted to reach or exceed the user-defined engine power parameter;
determining, via the control system, when the engine power parameter is met based on the monitoring of power via the at least one engine sensor; and
sending a command to the at least one valve to adjust to the valve position when the engine power parameter is met.

13. The method of claim 12, further comprising:
determining, via the control system, when the engine power does not equate to the engine power parameter based on the monitoring of power by the at least one engine sensor; and
sending a second command to adjust to a second valve position.

14. The method of claim 13, wherein the second valve position is a fully open position.

15. The method of claim 12, wherein the control system comprises a non-transitory memory for storing the software program thereon and a processor for executing the software program.

16. The method of claim 12, wherein the engine power parameter is a measured rate of increase in engine power.

17. The method of claim 12, wherein the engine power parameter is a percent shaft horsepower parameter.

18. The method of claim 12, wherein the predetermined range includes a limit based on an engine core flow extraction certification limit.

19. The method of claim 12, further comprising monitoring a flowrate of the amount of bleed air via a flowrate sensor.

20. The method of claim 12, further comprising:
receiving the amount of bleed air into an Environmental Control System (ECS); and
regulating and providing an air supply to one or more aircraft environments from the ECS.

* * * * *